3,423,355
CATALYTIC KETONE SOLUTION PROCESS FOR PREPARING HIGH BULK DENSITY, HIGH MOLECULAR WEIGHT STYRENE-MALEIC ANHYDRIDE POLYMERS
Joseph A. Verdol, Dolton, and Marc O. Thienot, Park Forest, Ill., assignors to Sinclair Research, Inc., New York, N.Y., a corporation of Delaware
No Drawing. Filed Jan. 21, 1965, Ser. No. 427,080
U.S. Cl. 260—32.8            9 Claims
Int. Cl. C08f 1/08, 19/02

ABSTRACT OF THE DISCLOSURE

A process for the production of high molecular weight, high bulk density polymers of styrene and maleic anhydride which comprises contacting styrene, maleic anhydride and a free-radical initiating polymerization catalyst having a half-life of up to 1 hour at 80° C. in an inert, normally liquid ketone solvent, at a temperature of about 30° C. to 80° C. to provide as a solution in said inert ketone solvent a copolymer of styrene and maleic anhydride having a kinematic viscosity in 10% acetone of at least about 10 centistokes.

---

The present invention is directed to a process for the production of high molecular weight polymers of an olefinic compound such as styrene, and a maleic compound such as maleic anhydride.

A method commonly employed for the production of high molecular weight styrene-maleic anhydride copolymers involves polymerizing the monomers in a hydrocarbon solvent under precipitation conditions. In this method the polymerization is conducted at moderately low temperatures, e.g. 50–100° C., using hydrocarbon solvents (either aromatic, aliphatic or mixtures thereof) such as benzene, toluene, xylene, heptane, cyclohexane etc., or chlorinated hydrocarbon solvents such as methylene chloride with conventional catalysts such as benzoyl peroxide, lauroyl peroxide, azobisisobutyronitrile and the like. When polymerization of styrene and maleic anhydride is carried out using solvent and catalyst systems of this type, polymers of moderately high molecular weight and high melting point are ordinarily obtained. Depending on the specific system selected, the molecular weight usually varies from 10,000 to 100,000 or above.

Owing to the high melting points and high molecular weights obtained with solvent and catalyst systems of the type described the polymers obtained are generally insoluble or only slightly soluble in the solvent system during the course of the polymerization reaction. Consequently, the polymerization reaction under what may be called "precipitating conditions," that is, conditions wherein the monomers are completely soluble in the polymerization solvent system and the polymer formed is insoluble or very slightly soluble so that immediate precipitation of the polymer occurs during its formation.

Although polymerization under "precipitating conditions" can be employed to prepare styrene-maleic anhydride resins of high molecular weight such systems are considered far from ideal. For example, when polymerizing under precipitating conditions it is usually necessary to limit the total solids content during polymerization to about 10–20%. If higher solids content are present in the polymerization mixture, the product becomes swollen with solvent and unreacted monomer to form a gelatinous cake which proceeds to harden on the walls of the reactor. This material can not be pumped easily and frequently must be removed manually from the reactor, therefore, from the practical standpoint, polymerization under precipitating conditions is usually carried out at a low solids content, below which will provide a pumpable slurry containing polymer, unreacted monomer and solvent.

Another inherent disadvantage of the precipitating polymerization procedure is that vast quantities of hydrocarbon solvents must be handled during large scale production. In order to make the process economical, it is necessary to recover and recycle (usually by distillation) the majority of the solvent obtained by filtration and drying of the polymer. The high melting point of the polymer does not permit the use of an extruder for drying, therefore, drying of the polymer entails the use of filtration or centrifugation to prepare for post treatment of the polymers in a suitable drying oven.

The problems caused by the precipitating polymerization methods described above have led to investigations of solution polymerization methods for the preparation of high molecular weight styrene-maleic anhydride polymers. In this type of polymerization method an oxygenated solvent, usually a ketone such as methyl ethyl ketone or acetone, wherein both the reactants and the polymer product are soluble, is employed and the polymerization is conducted at temperatures of over about 80° C. in the presence of a catalyst such as benzoyl peroxide or lauroyl peroxide. It has been found that although this method is capable of producing styrene-maleic anhydride products having a molecular weight range of about 7,000 to 50,000, a major problem encountered has been the poor reproducibility of molecular weight from batch to batch. This has been especially true for the higher molecular weight range products, e.g. in the 30,000 to 50,000 molecular weight range or over. Another problem with this method is that the yields of polymer product are less than desired. Increasing the polymerization temperature in order to increase yields has not provided the answer since these high temperatures produce low molecular weight polymer products. Polymerization temperatures lower than about 80° C. give significantly poorer yields and slow down the reaction considerably. Likewise, adding more catalyst only produces lower molecular weight polymer, while reducing the amount of catalyst depreciates yields and slows the reaction.

We have now found a method of preparing high molecular weight styrene-maleic anhydride type polymers in near quantitative yields, usually on the order of at least about 90% by weight, which method does not suffer from the disadvantage of poor reproducibility from batch to batch. Another advantage of the method of the present invention is that the poylmerization can be carried out at lower temperatures than solution polymerization processes of the art without reducing the yields of high molecular weight product.

In accordance with the method of the invention a vinyl monomer such as styrene, and a maleic compound are polymerized in the liquid phase at a temperature of about 30° C. to 80° C., preferably 30 to 60° C. in the presence of an inert, ketone solvent and a polymerization catalyst having a half-life of up to 1 hour at 80° C. The reaction can be conveniently conducted at atmospheric pressure but sub- and superatmospheric pressures may be used. The polymer products of the invention are solids having a Staudinger average molecular weight of usually at least about 18,000 often up to about 100,000 but may even be as high as 1,000,000 or more. The melting point or range of the polymer products will often be at least about 200° C. and their kinematic viscosity as measured at 30° C. in 10% solution in acetone is at least about 10 centistokes, often at least about 30 centistokes and preferably at least about 70 centistokes up to 300 centistokes or even 500 centistokes or more. An advantage of the polymerization process of the invention is that the polymer product possesses a high bulk density, usually at least about 20 lbs./ft.³ density.

The catalyst of the present invention is a low temperature, free-radical initiating polymerization catalyst having a half-life of up to 1 hour at 80° C., preferably a half-life of up to 1 hour at a temperature of about 50 to 80° C. These catalysts are to be distinguished from the conventional peroxide catalyst such as lauroyl peroxide, benzoyl peroxide, tertiary butyl hydroperoxide and the like which do not have a half-life of up to one hour at 80° C. and are unsuitable for use in the present invention. Illustrative of the low temperature catalysts of the present invention are alkyl peroxy dicarbonates having the structural formula:

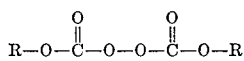

wherein R is a primary, secondary or tertiary lower alkyl radical say of 1 to 5 carbon atoms or combinations thereof; and tertiary alkyl peroxy esters of neo acids having the structural formula:

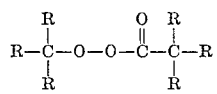

wherein R is a straight or branched chain lower alkyl radical of say 1 to 5 carbon atoms. Specific examples of suitable alkyl peroxy dicarbonates are dimethyl peroxy dicarbonates, diethyl peroxy dicarbonates, dipropyl peroxy dicarbonate, diisopropyl peroxy dicarbonate, dibutyl peroxy dicarbonate, diisobutyl peroxy dicarbonate, methyl isopropyl peroxy dicarbonate, ethyl propyl peroxy dicarbonate, etc. The tertiary alkyl peroxyesters of neo acids include for instance, tertiary ethyl, pentyl, heptyl and hexyl esters of the neoalkanoic acids having a total of up to 12 carbon atoms such as neopentanoic acid; α,α'-dimethyl butanoic acid; α,α'-dimethyl pentanoic acid; α,α'-methyl ethyl pentanoic acid; α,α'-diethyl butanoic acid; α,α'-diethyl pentanoic acid; and the like. By neo is meant a monocarboxylic acid in which the α carbon atom contains no hydrogen. The alcohol-derived portion of the peroxyesters preferably have up to about 8 carbon atoms.

The ketone solvents of the present invention are normally liquid and usually boil above about 40° C. at atmospheric pressure. The solvents are preferably alkanones, e.g. containing about 3 to 6 carbon atoms. Illustrative of suitable ketones are acetone, diethyl ketone, dipropyl ketone, methyl isobutyl ketone, cyclohexanone, methyl ethyl ketone, ethyl propyl ketone, benzyl phenyl ketone, methyl phenyl ketone, butyl phenyl ketone and the like. The ketone solvents are distillable from the polymer product without undue degradation of the product. While in general, such ketones can be further substituted by functional groups which are essentially non-reactive in the system, it is preferred that the ketone contain only carbon, hydrogen and oxygen atoms. Ketones which contain a carbon atom having at least one hydrogen atom on each carbon atom adjacent to the carbonyl carbon atom are most effective. A particularly preferred group of ketones comprising the lower boiling ketones, for example, boiling below about 200° C., especially acetone, acetophenone, methyl ethyl ketone and methyl propyl ketone. It is to be understood that mixtures of the above described ketone solvents can be employed if desired.

The polymerization reaction can be conducted by various processing techniques provided that the monomers and catalysts are in contact with each other in the inert, ketone solvent at the polymerization temperature. A method for proceeding according to the present invention comprises first forming a stock solution of the maleic anhydride, styrene and low temperature catalyst in the ketone solvent under conditions wherein no copolymerization occurs (usually below about 25° C.) then feeding this solution to ketone solvent in a reactor, preferably the same ketone solvent as that which is employed for forming the solution, which solvent has been preheated and maintained at the defined polymerization temperature. The feeding of the stock solution of monomers and catalysts to the solvent in the reactor is conducted at a rate which does not exceed the rate of copolymerization of monomers. The inert ketone solvent may contain other materials, and for instance, may be a solvent present in the medium of a previous reaction of the invention conducted on a continuous or semi-continuous basis. Another method, especially for large scale polymer production, entails the concurrent addition of a solution of the monomers in a ketone solvent and catalyst solution also in a ketone solvent from individual feed systems into a reactor containing a heel of the ketone solvent heated to reaction temperature.

The maleic anhydride polymerized with the styrene can contain substituents which do not inhibit or unduly interfere with the polymerization reactions. Typical examples of maleic anhydrides include methyl maleic anhydride, propyl maleic anhydride, 1,2-diethyl maleic anhydride, phenyl maleic anhydride, cyclohexyl maleic anhydride, benzyl maleic anhydride, chloro maleic anhydride, and the like including the maleic acid forms. The styrene or other vinyl monomer, likewise can be substituted with non-interfering groups. Also, in addition to the styrene and maleic anhydride monomers, minor amounts, say up to about 30% by weight of the reactants of other polymerizable unsaturated compounds can be included in the polymerization to form, for instance, terpolymers or other heteropolymers. Examples of polymerizable unsaturated compounds include vinyl compounds such as vinyl acetate, vinyl halides, vinyl ethers, divinyl benzene; unsaturated alkylene monocarboxylic acid and their esters such as acrylic acid, methacrylic acid and their esters; acrylonitrile compounds such as alkyl diglycol carbonate and dialkyl maleate; and other olefinically unsaturated compounds such as butadiene, isoprene and the like.

The proportion of the reagents, ketone solvent and catalyst employed in the polymerization can be varied to a considerable extent, depending primarily upon the particular molecular weight polymer desired. Generally, proportions of styrene to maleic anhydride of about 1:1 to 20:1 and higher can be employed. It is preferred, however, to employ molar proportions of styrene to maleic anhydride of about 1:1 to 3:1. In the method of forming the polymer wherein a stock solution of the monomers and catalyst in the solvent is first prepared, the concentration of the monomers can often vary between about 3 to 75 percent by weight, based upon the total weight of the monomers and the solvent. It is preferred, however, to employ concentrations of monomers between about 15 to 40 percent by weight based on the total of the monomers and solvents.

The low temperature catalyst of the invention can also be employed in varying amounts, depending upon the particular catalyst selected, the reaction temperature, and the molecular weight of the polymer desired. In all cases, however, the catalyst of the invention is employed in catalytic amounts which in general may be much lower concentrations than is required for the conventional higher temperature free-radical catalysts. Normally, about .01 to 1% by weight of the catalyst, based on the total weight of the monomers, is all that is required even though larger amounts could be employed. Catalyst concentrations of about 0.05 to 0.6% by weight are usually preferred.

The following examples are included to further illustrate the invention.

Example I

Styrene and maleic anhydride were polymerized in the presence of a diisopropyl peroxy dicarbonate catalyst in the amounts and under the conditions shown in Table I below. The polymerizations were conducted according to the following general procedure: The styrene, maleic anhydride and diisopropyl peroxy dicarbonate were dissolved in the ketone solvent. The mixture was cooled to a temperature that precludes copolymerization and fed into a reactor containing the same ketone solvent heated to the indicated reaction temperature. The mixture was stirred during the reaction in the reactor equipped with a nitrogen inlet, thermometer and reflux condenser. Separation of the polymer on completion of the reaction was in most cases affected by both precipitation and solvent stripping. Precipitation of the polymer product in the runs wherein acetone was employed as the ketone solvent was effected by adding water to the reaction mixture. In the runs wherein methyl ethyl ketone was employed as solvent, the copolymer was precipitated in monomer pentane. Solvent stripping, whether acetone or methyl ethyl ketone was employed, was accomplished by steam distillation. The separated products were filtered and dried. The molecular weights as measured by the kinematic vis-viscosity along with the yields of products obtained are also summarized in Table I.

3. The process of claim 1 wherein the catalyst is an alkyl peroxy dicarbonate having the structural formula:

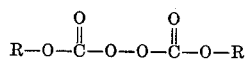

wherein R is a lower alkyl group.

4. The process of claim 1 wherein the catalyst is an ester having the structural formula:

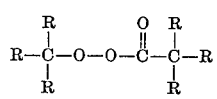

wherein R is a lower alkyl group.

5. The process of claim 2 wherein the copolymer product is separated by adding water to the copolymer solution to precipitate said copolymer.

TABLE I.—STYRENE-MALEIC ANHYDRIDE COPOLYMERIZATION IN THE PRESENCE OF DIISOPROPYL PEROXY DICARBONATE

| Tests | Solvent | Kinematic viscosity, 30° C., 10% acetone centistokes | | Yield wt. percent | | Monomers concentration, wt. percent | Initiator concentration, wt. percent | Reaction temperature, °C. | Reaction time, hours |
|---|---|---|---|---|---|---|---|---|---|
| | | Precipitation | Solvent stripping | Precipitation | Solvent stripping | | | | |
| 172 | Acetone | 264.87 | 192.94 | 94.18 | 98.53 | 30.0 | 0.16 | 40 | 4 |
| 112 | do | 92.63 | | 95.40 | | 30.0 | 0.158 | 40 | 1 |
| 164 | do | 71.41 | 165.07 | 80.33 | 93.78 | 30.0 | 0.04 | 56.5 | 6 |
| 176 | do | 64.82 | 104.81 | 100.0 | 100.00 | 30.0 | 0.24 | 40.0 | 4 |
| 166 | do | 51.33 | 78.82 | 100.0 | 87.65 | 30.0 | 0.08 | 56.5 | 4 |
| 168 | do | 48.14 | 1017.85 | 67.47 | 96.16 | 30.0 | 0.02 | 56.5 | 6 |
| 174 | do | 33.00 | 116.88 | 97.56 | 75.20 | 30.00 | 0.32 | 40.0 | 4 |
| 114 | do | 21.67 | | 96.40 | | 30.00 | 0.158 | 56.5 | 1 |
| 162 | do | 21.50 | 17.99 | 100.00 | 100.00 | 30.00 | 0.16 | 56.5 | 4 |
| 100 | do | 12.99 | | 99.50 | | 17.7 | 0.60 | 40.0 | 3 |
| 120 | do | 12.17 | | 99.72 | | 30.0 | 0.60 | 56.5 | 2 |
| 178 | Methyl ethyl ketone | 393.97 | 131.37 | 78.84 | 91.01 | 30.0 | 0.16 | 40.0 | 4 |
| 184 | do | 96.05 | 58.55 | 100.00 | 100.00 | 30.0 | 0.16 | 48.0 | 4 |
| 180 | do | 33.93 | 28.19 | 100.00 | 100.00 | 30.0 | 0.16 | 56.5 | 4 |
| 182 | do | 16.37 | 18.34 | 92.00 | 99.72 | 30.0 | 0.16 | 80.0 | 4 |
| 110 | do | 6.37 | | 100.00 | | 30.0 | 0.158 | 80.0 | 1 |

Example II

Styrene and maleic anhydride were copolymerized in the presence of tertiary butyl peroxy pivalate under the conditions shown in Table II below employing the general procedure described in Example I above. The kinematic viscosity and yields of product obtained are also shown in Table II.

6. The process of claim 1 wherein the inert ketone solvent is methyl ethyl ketone.

7. The process of claim 3 wherein the catalyst is diisopropyl peroxy dicarbonate.

8. The process of claim 4 wherein the catalyst is tertiary butyl peroxy pivalate.

9. A process for the production of high molecular

TABLE II.—STYRENE-MALEIC ANHYDRIDE COPOLYMERIZATION IN THE PRESENCE OF TERTIARY BUTYL PEROXY PIVALATE

| Test | Solvent | Apparent bulk density, lbs./ft.³ | Kinematic viscosity 30° C., 10% acetone, centistokes | Melting range, °C. | Yield, wt. percent | Monomers concentration, wt. percent | Initiator concentration, wt. percent | Reaction temperature, °C. | Reaction time, hours |
|---|---|---|---|---|---|---|---|---|---|
| 150 | Acetone | 30.14 | 133.35 | 255–268 | 64.70 | 30.0 | 0.04 | 56.5 | 4 |
| 148 | do | 33.88 | 70.67 | 247–267 | 79.14 | 30.0 | 0.08 | 56.5 | 4 |
| 116 | do | 34.13 | 53.11 | 248–268 | 92.80 | 30.0 | 0.158 | 56.5 | 3 |
| 90 | do | 37.12 | 12.19 | 243–266 | 86.50 | 17.7 | 0.6 | 56.5 | 3 |
| 160 | Methyl ethyl ketone | 31.64 | 155.49 | 254–272 | 74.79 | 30.0 | 0.02 | 80.0 | 4 |
| 158 | do | 31.27 | 110.99 | 255–273 | 84.68 | 30.0 | 0.04 | 80.0 | 4 |
| 156 | do | 21.23 | 49.68 | 258–274 | 92.99 | 30.0 | 0.08 | 80.0 | 4 |
| 106 | do | 30.39 | 24.64 | 242–265 | 95.60 | 30.0 | 0.158 | 80.0 | 1 |

The data of Tables I and II demonstrate the high yields of high molecular weight copolymers obtainable by the process of the present invention. The data also show the high density products produced by the invention.

It is claimed:

1. A process for the production of high molecular weight, high bulk density polymers of styrene and maleic anhydride which comprises contacting styrene, maleic anhydride and a free-radical initiating polymerization catalyst having a half-life of up to 1 hour at 80° C. in an inert, normally liquid ketone solvent at a temperature of about 30° C. to 80° C. to provide as a solution in said inert ketone solvent a copolymer of styrene and maleic anhydride having a kinematic viscosity in 10% acetone of at least about 10 centistokes, and a bulk density of at least about 20 lbs./ft.³.

2. The process of claim 1 wherein the ketone solvent is an alkanone containing about 3 to 6 carbon atoms.

weight, high bulk density polymers of styrene and maleic anhydride which comprises contacting styrene, maleic anhydride and a free-radical initiating polymerization catalyst having a half-life of up to 1 hour at 80° C. in an inert, normally liquid ketone solvent of about 3 to 6 carbon atoms, at a temperature of about 30° C. to 80° C. to provide as a solution in said inert ketone solvent a copolymer of styrene and maleic anhydride having a kinematic viscosity in 10% acetone of at least about 10 centistokes, and a bulk density of at least about 20 lbs./ft.³, said free-radical initiating polymerization catalyst being selected from the group consisting of alkyl peroxy dicarbonates having the structural formula:

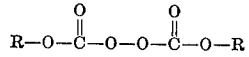

wherein R is a lower alkyl group, and esters having structural formula:
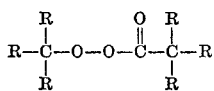
wherein R is a lower alkyl group.
References Cited
UNITED STATES PATENTS
2,497,323 2/1950 Roedel _____ 260—87.5
2,464,062 3/1949 Strain.
3,207,718 9/1965 Zimmerman et al. ___ 260—78.5
3,240,763 3/1966 Pledger _____ 260—78.5
FOREIGN PATENTS
659,739 3/1963 Canada.
OTHER REFERENCES
Mageli et al., vol. 36, Mod. Plastics, 1959 (March-May), pp. 135–144.
JOSEPH L. SCHOFER, *Primary Examiner.*
JOHN KIGHT, *Assistant Examiner.*
U.S. Cl. X.R.
260—78.5